Sept. 17, 1968    W. D. ROSSER    3,401,719
MULTIPLE BLEED VALVE CARTRIDGE ASSEMBLY
Filed March 31, 1966
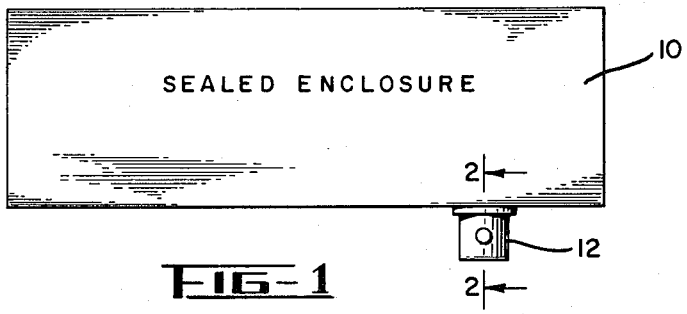
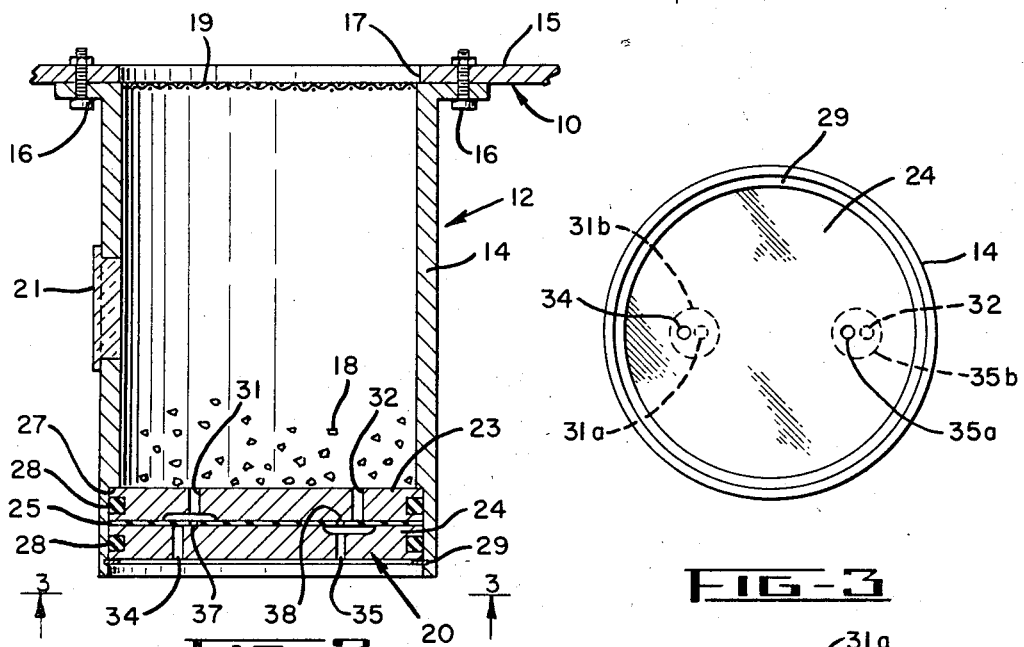
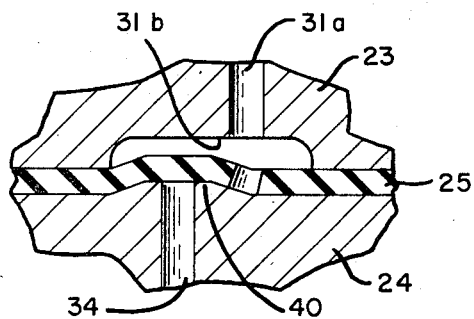
INVENTOR.
WILLIAM D. ROSSER
BY *John F. Lawler*
ATTORNEY United States Patent Office 3,401,719
Patented Sept. 17, 1968

3,401,719
MULTIPLE BLEED VALVE CARTRIDGE ASSEMBLY
William D. Rosser, San Francisco, Calif., assignor to Sylvania Electric Products Inc., a corporation of Delaware
Filed Mar. 31, 1966, Ser. No. 539,076
2 Claims. (Cl. 137—493.8)

ABSTRACT OF THE DISCLOSURE

This valve assembly has a diaphragm responsive to differential pressure to open and close ports and control fluid communication in opposite directions through the valve. The diaphragm has two openings offset from the ports normally closed by the diaphragm and generally aligned with normally open ports, respectively, on the side of the diaphragm opposite from the normally closed ports. Fluid passes in one direction only at one time through this valve so that bidirectional fluid communication through two sets of said ports is established.

---

This invention relates to fluid valves, and more particularly to pressure release or bleed valves.

Pressure responsive or bleed-type valves operate in response to a differential pressure and usually against the action of a spring-like member which tends to close or open the valve as the application requires. Poppet valves utilized for this purpose generally have a valve seat against which a separate valve head is pressed by the poppet valve spring. Such a valve depends on fluid-impervious seating of the valve head and accordingly is sensitive to corrosive gases, liquids, and other fluids which may pit and roughen mating valve surfaces and thus impair the effectiveness of the seal. The worn or corroded surfaces on valves of this type are costly to clean and maintain and may necessitate even more costly replacement. The problem is compounded with miniaturized valve structures. Furthermore, shutdown or malfunctioning of operating equipment due to worn valves may even have drastic consequences.

An object of this invention is the provision of a relief valve with a high degree of resistance to corrosion and wear.

Another object is the provision of a relief valve capable of being miniaturized without adversely affecting the ability of the valve to withstand wear or corrosive fluids.

Another object is the provision of a pressure relief valve which readily may be disassembled and reassembled for maintenance and repair.

Still another object is the provision of a low-cost, compact, easily-constructed pressure relief valve with a minimum of different parts.

These and other objects of the invention are accomplished with a valve having a diaphragm which flexes in response to a differential pressure across the valve to open and close ports which control fluid communication in opposite directions through the valve. The diaphragm has two openings respectively offset from ports normally closed by the diaphragm and generally aligned with normally open ports respectively located on the side of the diaphragm opposite from the normally closed ports. Fluid may pass in one direction only through an adjacent pair of normally open and normally closed ports so that bidirectional fluid communication through the valve requires the two sets of such ports. Differential pressure across one set of the ports causes the diaphragm to flex and lift off the closed port so that fluid can pass through the adjacent diaphragm opening to the aligned normally open port. Under this condition, the closed port of the other set of ports remains sealed by the diaphragm since the pressure difference is in a direction to press the diaphragm against that port. The entire valve assembly is a sandwich construction that may be readily dismantled and reassembled for repair and cleaning. Fluid capacity of the valve is determined, inter alia, simply by the diameters of holes in the valve body, and the single diaphragm constitutes the only moving part of the structure regardless of the number of sets of ports utilized.

Other objects of the invention will become apparent from the following description of a preferred embodiment thereof reference being had to the accompanying drawings in which:

FIGURE 1 is an elevation of a sealed enclosure with a breathing unit having a valve structure embodying this invention;

FIGURE 2 is an enlarged section taken on line 2—2 of FIGURE 1;

FIGURE 3 is a bottom view of the breathing unit showing the valve unit in plan as viewed on line 3—3 of FIGURE 2;

FIGURE 4 is a greatly enlarged view of a portion of FIGURE 2 showing details of the valve structure; and FIGURE 5 is a view similar to FIGURE 4 showing a modified form of valve structure.

An embodiment of the invention is shown in FIGURE 1 as a sealed enclosure 10 which is vented through a breathing chamber 12. Enclosure 10, for example, may be the housing for airborne electronic gear provided with breathing chamber 12 in order to equalize pressure and temperature within the enclosure and to prevent condensation of moisture on the equipment.

Breathing chamber 12 comprises a tubular container 14, see FIGURE 2, secured to the outside of wall 15 of the enclosure by bolts 16 in alignment with an opening 17 in the wall. Container 14 preferably is filled with a desiccant 18, such as silica gel, and is covered at the end connected to the enclosure by a screen 19. The opposite end of the tubular container is closed by a valve structure 20 described in detail below. The color of the desiccant as a measure of its absorbent capacity may be viewed through a window 21 in the side of container 14.

In accordance with this invention, valve structure 20 comprises plates 23 and 24 separated by a resilient diaphragm 25 preferably made of an elastomer or other corrosion-resistant synthetic material. In the embodiment shown in the drawings, the plates are disc-like members and are sealed in a recess 27 in the outer end of container 14 by seal rings 28. A snap ring 29 removably secures the plates in vertically stacked position.

Plate 23 is formed with laterally-spaced openings 31 and 32 therethrough and plate 24 similarly has openings 34 and 35 which are nearly aligned with openings 31 and 32, respectively. Openings 31 and 34 comprise one set defining a one-way passage for air into enclosure 10 and openings 32 and 35 are a second set through which air passes from the enclosure to the exterior. Thus, the two sets of openings control the bi-directional venting or "breathing" of the enclosure. The configuration of the two sets of openings and their valving action are substantially identical and therefore only one set, openings 31 and 34, will be described in detail in conjunction with FIGURE 4.

Opening 31 in plate 23 comprises a small diameter cylindrical section 31a and an intersecting wide diameter section 31b which forms a manifold-type recess at the inner face 23a of the plate. The diameter of opening 34 in plate 24, however, is substantially constant and preferably equal to the diameter of section 31a of hole 31. When the plates are stacked in the operative position as shown in FIGURES 2 and 4 with diaphragm sandwiched therebetween, opening 34 in plate 24 is aligned with the recess section 31b but is offset from the section 31a of the opening 31 in plate 24. Similarly, opening 35 in plate 24 has a recess section 35b, see FIGURE 3, adjacent to the diaphragm and opening 32 and is aligned with that recess section but offset from the small diameter section 35a of opening 35.

Control of fluid flow through openings 31 and 34 is effected by diaphragm 25 which has an aperture 37 within the area bounded by the recess 31b and offset from opening 34. Thus, the diaphragm 25 normally closes opening 34 when the pressure on the opposite side of the diaphragm is greater than that within opening 34. Preferably, aperture 37 is aligned with the small diameter portion 31a of opening 31. Diaphragm opening 38 similarly is offset from opening 32, is within recess 35b, and is aligned with opening 35a.

The operation of the inlet valve portion of structure 20 will now be explained with reference to FIGURE 4. When pressure external to enclosure 10 increases to an extent that it exceeds the pressure inside the enclosure, the resulting differential pressure applied across diaphragm 25 at the mouth of opening 34 tends to lift the diaphragm into recess 31b as shown in broken lines. The diaphragm thus unseats opening 34 and exposes diaphragm aperture 37 so that fluid may pass from opening 34 through aperture 37 and opening 31 to the sealed enclosure. The outlet valve structure responds to the reverse differential pressure in the same manner to permit air to flow from the enclosure to the exterior.

The threshold pressure required to open the valve depends, inter alia, upon the flexibility of the diaphragm and may be reduced by providing a raised lip 40, see FIGURE 5, around the mouth of opening 34 and under the diaphragm aperture. Such threshold or cracking pressure of the valves typically is approximately one-eighth of a pound per square inch.

From the foregoing description, it will be seen that an easily-maintainable, low-cost, simple relief or bleed valve structure is provided. Plates 23 and 24 may be and preferably are substantially identical in construction, and thus further simplify the structure and minimize the number of different parts required. The only moving part is the portion of the diaphragm bounded by recesses at the inner faces of the plates. The valve structure may be readily repaired and cleaned by removal of the snap ring 29 and disassembly of the parts. Miniaturization of the valve is readily achieved since this merely involves control of the size of the plate openings and apertures.

While the valve structure embodying this invention is described in conjunction with a sealed enclosure of the type utilized to house electronic gear, it will be understood that such embodiment is given by way of example. The valve may be used in many other systems, and has particular utility in artificial heart pumps and in food machinery in which the ease of disassembly and sterilization of the valve structure is especially advantageous. While two sets of valves are shown in the above-described embodiment, additional sets may be added if required to permit increased rates of fluid flow at increased pressure drops. The scope of the invention is defined in the appended claims.

I claim:
1. A valve for fluids or the like comprising:
first and second stacked plates having a first pair of openings, respectively, therethrough intersecting adjacent faces of the plates at opposed locations whereby to form a first fluid passage through the plates,
said plates having a second pair of similar openings forming a second fluid passage therethrough,
a flexible diaphragm sealed between said adjacent faces of the plates and traversing the inner ends of both said first and second pairs of openings,
said diaphragm having an aperture therein fully offset from one of said first pair of openings and opposite the other opening of the first pair whereby said diaphragm normally seals said one opening, said diaphragm being responsive to a differential pressure of one sense across said plates to unseal said one opening and establish fluid flow in one direction through said first pair of openings,
said diaphragm also having a second aperture fully offset from one of said second pair of openings and opposite the other opening of said second pair whereby said diaphragm normally seals said one opening of the second pair, said diaphragm being responsive to a differential pressure of reverse sense across said plates for unsealing said one opening of the second pair and establishing fluid flow through the second pair of openings in a direction opposite to said one direction,
said one opening of the first pair and said one opening of the second pair being formed in different plates.

2. A valve for fluids or the like, comprising:
first and second stacked plates having one set of openings, respectively, therethrough intersecting adjacent faces of the plates at opposed locations whereby to form a fluid passage through the plates,
a flexible diaphragm sealed between said adjacent faces of the plates and traversing the inner ends of said openings,
said diaphragm having an aperture therein fully offset from one of said openings and opposite the other whereby said one opening is normally sealed by the diaphragm and fluid communication in one direction between the openings occurs through said diaphragm aperture when the diaphragm lifts from said one opening in response to a predetermined differential pressure across both openings,
the transverse dimension of said other opening at its inner plate face intersection being greater than the corresponding dimension of said one opening,
said plates also having a second set of openings, respectively, therethrough intersecting adjacent faces of the plates at opposed locations laterally spaced from the first set of openings providing a second fluid passage through said plates,
said diaphragm traversing the inner ends of said second set of openings and having a second aperture offset from one opening of the second set and opposite the other opening thereof,
said one opening of the first set and said other opening of the second set being formed in the same plate whereby fluid flows in opposite directions through the first and second fluid passages, respectively.

References Cited
UNITED STATES PATENTS

| | | | |
|---|---|---|---|
| 471,630 | 3/1892 | Walker | 137—525 XR |
| 2,707,074 | 4/1955 | Tussey | 137—525 XR |
| 2,758,609 | 8/1956 | Dickert et al. | 137—525 |
| 3,308,851 | 3/1967 | Zo Ludow | 137—493.8 |
| 3,319,879 | 5/1967 | Brown | 137—525.3 |

FOREIGN PATENTS 1,026,735  10/1950  France.

HENRY T. KLINKSIEK, *Primary Examiner.*
R. J. MILLER, *Assistant Examiner.*